Patented Mar. 8, 1932

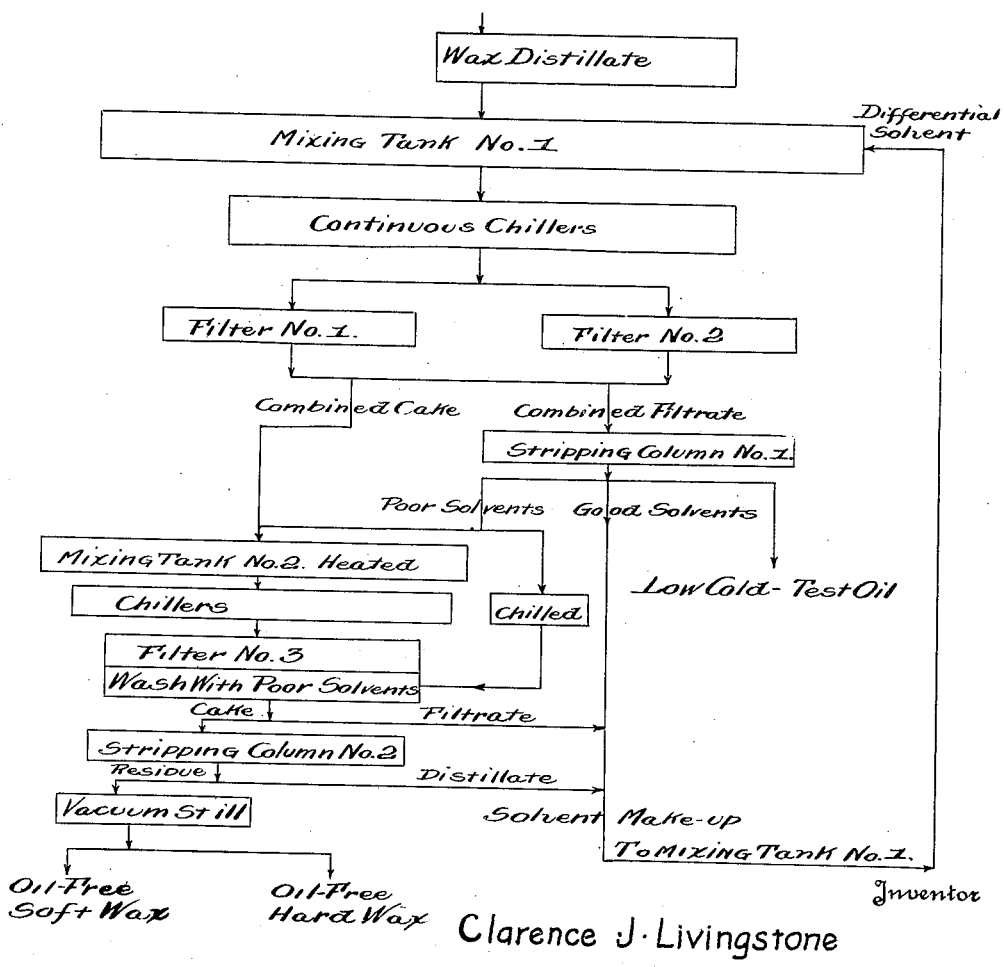

1,848,636

UNITED STATES PATENT OFFICE

CLARENCE J. LIVINGSTONE, OF PITTSBURGH, PENNSYLVANIA, ASSIGNOR TO GULF REFINING COMPANY, OF PITTSBURGH, PENNSYLVANIA, A CORPORATION OF TEXAS

SEPARATION AND PURIFICATION OF WAX

Application filed September 26, 1930. Serial No. 484,658.

This invention relates to the separation and purification of wax; and it comprises a process of separating commercially pure wax from wax-containing mineral oils by mixing the said materials with a liquid differential solvent mixture containing both good solvents for wax and poor solvents for wax, chilling the liquid mixture, precipitating wax therefrom, separating residual liquid mixture therefrom into at least three parts comprising wax-free residues, the good solvents for wax and the poor solvents for wax, suspending the separated wax in the said poor solvents, chilling the suspension, separating wax therefrom; the separated wax being thereafter advantageously washed with additional poor solvents; stripping the poor solvents from the wax thereby recovering the so purified wax, uniting the recovered poor solvents with any washings and with the said separated good solvents and returning the so reconstituted differential solvent mixture to the first step in the process; all as more fully hereinafter set forth and as claimed.

The removal and recovery of wax from heavy uncracked mineral oil distillates and residua has always presented a difficult problem for the oil industry. While the wax may be separated from the lighter uncracked distillates and from slightly heavier cracked distillates by mere chilling and filtering, any wax separated in this manner from the heavier fractions and residua, such as cylinder stocks, is precipitated in an amorphous form known as petrolatum. Separation of this product by the filter press is obviously impossible. Separation is made either by cold gravity separation or by a centrifuge. Moreover, these oils are too viscous to be processed at ordinary temperatures in these ways and require dilution. A heavy naphtha is commonly used as a diluent in the ratio of about 2 volumes of naphtha to 1 of oil. The naphtha aids in the wax separation in chilling. Wax removal may be accomplished on the crude oil after distillation for separation of the gasoline, kerosene and gas oil fractions only, and hence before the viscosity has become too great for processing. All types of waxes may be precipitated by chilling, varying from hard paraffin, through ceresin-like products and finally to petrolatum jelly.

In wax-recovering processes using chilling, the chilling reduces the solvent power of the wax-bearing oil for wax and causes a separation or precipitation of wax in discrete particles; amorphous or crystalline, as the case may be. In diluting the oil with lighter liquid to reduce the viscosity, the solvent power for wax of the added liquid becomes important. In a general way, the solvent power of light hydrocarbons for wax is less than that of the heavy oils; and the customary dilution of heavy oil with naphtha therefore gives a better separation of wax in chilling. I have found that, for various reasons, it is better to use as a viscosity reducing diluent, a composite liquid containing a good solvent for wax as well as a poor solvent. With certain of these mixtures, a separation of the precipitate in crystalline form is promoted.

The so-called "heavy wax distillates" made by steam distillation are termed "unpressable distillates" due to the fact that the wax is precipitated in an amorphous form which is difficult to filter press, and such distillates are usually subjected to a redistillation under cracking conditions using minimal amounts of steam. The high temperatures act in some unknown manner to change the wax to a crystallizable form, readily filtered off.

Various methods have been proposed, chiefly dealing with the recovery of paraffin from tarry residues of coal distillation, for separating the paraffin by means of various diluent liquids of the nature of those called "solvents". Mixed solvents have been proposed. It has also been suggested to apply these methods to the removal of wax from mineral oil distillates and residua. But these methods have been in practice adopted only in rare instances, primarily due to the higher cost of these processes. High solvent loss has been considered an inherent difficulty. Subsequent purification of the separated wax has also proved to be expensive. These proposed methods have not been able to replace the older processes even when a cracking distillation would have been eliminated by their adoption.

Wax may be separated in filtrable form by the use of certain solvent mixtures from oils which, by usual processes, would separate amorphous wax; a form more difficult to handle. This gives a decided advantage to these methods. It has been proposed to use mixtures of two solvents for this purpose, in one of which the wax is more soluble than the other. The latter component then acts as a precipitating agent, somewhat in the manner that alcohol acts in the ether-alcohol mixture used in the well-known Holde method for paraffin determination in oil. Such mixtures may be called differential solvent mixtures.

I have found that the difficulties formerly encountered in operating the mixed solvent method for paraffin removal can be eliminated by a simple and commercially feasible method. I have reduced the solvent loss to a negligible point and have effected a convenient and inexpensive method of purifying the wax at the same time.

My process can be more conveniently understood by following the various steps in connection with the accompanying figure which shows a flow sheet of my process. In this illustration, the several steps are shown seriatim.

Wax-bearing oil is mixed with a differential solvent mixture, containing both good solvents for wax and poor solvents for wax, in mixing tank No. 1. It is then run through continuous chillers wherein the temperature may be reduced to the neighborhood of minus 20° F. The wax is filtered off, the filtrate being stripped and thereby separated into three components comprising wax-free oil, the good solvents for wax and the poor solvents for wax. The filter cake is then suspended in mixing tank No. 2 with a quantity of the poor solvents from the stripping column. This mixture may be heated, if desired, until the wax dissolves. The mixture is then chilled to a temperature at which the wax is practically insoluble in the poor solvent, which temperature may be, for example, from 15° to 30° F. and again filtered in filter No. 3. The filter cake may then be washed with additional poor solvents. Alternatively, the wax cake may be suspended in and repeatedly washed by the poor solvent without dissolving it. The filter cake is then conveniently melter and run through stripping column No. 2 to remove the last traces of solvent. The wax might be separated into fractions in the stripping column but this separation can be more conveniently made in a subsequent vacuum distillation as indicated on the flow sheet. The distillate from stripping column No. 2 and the filtrate from filter No. 3 are mixed with the good solvents recovered from stripping column No. 1 and the whole is then returned to mixing tank No. 1 to be mixed with a fresh batch of wax-bearing oil. By using continuous filters and chillers throughout, the whole process may be made continuous.

In the process outlined above, the chilling steps are not necessarily required. The whole process can be operated at ordinary temperatures. The mere mixing of the wax bearing oils with some types of differential solvent mixtures may cause separation of the wax, which separation, of course, usually becomes more complete upon chilling. The chilling of the mixture of wax with poor solvents in "mixing" tank No. 2" can also be dispensed with in the same manner.

Another modification which is sometimes advantageous is that of mixing the separated good solvents with wax bearing oils in "mixing tank No. 1" before adding the poor solvents recovered from the filtrate and distillate. This frequently results in a cleaner separation of the wax, especially when the process is operated without the chilling steps.

The wax may be removed from the process after the separation at "filters No. 1 and No. 2", the wax being purified by another independent process. In this case stripping is still advantageous in order to separate the filtrate into its constituents of poor solvents and good solvents. The latter may then be mixed with the wax bearing oil in "mixing tank No. 1" before the poor solvents are added. The gradual addition of the latter causes precipitation of the wax, the separation being sometimes cleaner than that obtained in case a mixed differential solvent is added directly to the wax bearing oil. The mixture of the wax bearing oil with the good solvents may be chilled before, after or during the addition of the poor wax solvents.

Rather a wide selection of good and poor solvents may be used in my process. Among the good solvents may be mentioned benzol, naphtha, carbon tetrachlorid, toluene, xylene and other products having about the same solvent power for wax. The poor solvents may comprise acetone, ethylene dichlorid, propylene dichlorid, ethyl alcohol, isopropyl alcohol, the butyl alcohols and the like. Mixtures of these poor solvents may be used. It is advantageous to use good solvents and poor solvents having appreciably different boiling point ranges, in order that these may be readily separated as two fractions in the stripping column. A clean separation is, of course, not essential. A particularly advantageous composition which I have used comprises benzol and ethylene dichlorid in the ratio of about 3 parts to 7, by weight.

My process may be used to separate wax from a great variety of mineral oil residues and distillates. I have tested the method with various wax distillates and have found that the wax distillates generally produced can be reduced by at least ¼ and still give satisfactory results. Coke still slops; acid treated, clay contacted cylinder stocks; unpressable distillates; reduced crudes; and bright stocks from unpressable distillates, etc., from various oil fields have given excellent results.

Wax can also be extracted from tarry residues, such as those produced in the low temperature carbonization of coal, by my process. Only minor changes in manipulation are required.

Wax separated by other processes can be purified by my method, which would then consist in dissolving the wax in the differential solvent mixture and proceeding further as described previously.

In a specific embodiment of my invention, representing an actual operation, I took 1000 parts of wax distillate and reduced this to 750 parts by distillation before mixing with my differential solvents. These were mixed in the proportions by weight of 80 parts of the reduced wax distillate, 36 parts benzol and 84 parts ethylene dichlorid. This mixture was chilled, cooling the same to about minus 20° F. The wax was filtered off and the filtrate stripped to separate it into its components, the oil recovered having a cold test of from minus 20° F. to minus 30° F. The recovered body of ethylene dichlorid was divided, 60 parts being used to suspend the wax filter cake. This suspension was heated to the neighborhood of 70° F., (approximately sufficient to dissolve the wax) and then chilled to plus 15° F. The wax was again filtered off and washed with the remaining ethylene dichlorid. The washed filter cake was then put through a stripping column, removing the last traces of solvent. The recovered distillate, containing principally ethylene dichlorid, was united with the filtrate from the previous operation and then the separated benzol was added, the whole forming a reconstituted differential solvent mixture to be used in the first step of the process. The solvent loss was practically negligible.

The wax recovered was a semi-refined wax, white and dry and with an unexpectedly low oil content. The low pour test of the oil was also highly satisfactory from an operating standpoint.

In the above example 5 to 10 per cent of the benzol can be replaced with petroleum naphtha, without appreciable change in operating conditions. The proportions of ethylene dichlorid and benzol can be varied, provided corresponding changes are made in the temperatures employed. Mixtures of the above mentioned good solvents and poor solvents may be used, to suit the characteristics of the product desired.

In stripping the filtrate from filters No. 1 and No. 2, it is not necessary that the good solvents be completely separated from the poor solvents. It is only required that two cuts be produced, one of said cuts being a poor solvent for the wax.

By using the poor solvents for purifying and washing the wax cake, a considerably higher yield and a whiter product is obtained. The poor solvent for the wax serves to dissolve oil from the cake as well as any good solvents remaining therein and, upon chilling, the wax is precipitated from a liquid in which it is but very slightly soluble. Hence but little of the solvent is dissolved in the wax and vice versa. The separation is practically complete. Any solvent entrained by the wax is also more readily removed in the stripping operation. It is undoubtedly due to these factors that my process gives a higher yield of both oil and wax, a more highly refined wax and a wax-free oil of lower pour test than processes heretofore proposed.

By my method I am enabled to use a wax distillate which has been reduced to the point where the solar fraction is removed. In fact it is even possible to satisfactorily dewax a distillate containing some portions of ordinarily unpressable wax while still recovering a good wax. This results in a considerable reduction in the cost of the operation as a whole. The pour points obtained for the wax-free oil are considerably lower than those obtained by prior methods. The yields of both oil and wax are high and a white, dry, hard wax is obtained, sufficiently pure to serve as a semi-refined product without the use of sweating.

It is obvious that many modifications may be made in my process without departing from the spirit of my invention.

What I claim is:—

1. In the separation and purification of wax from wax containing mineral oils and tarry residues, the process which comprises mixing the said materials with a differential solvent mixture containing poor wax solvents and good wax solvents, separating the wax from the mixture, separating the solvents from residual liquid and thereafter further purifying the separated wax by treatment with the said poor solvents.

2. In the separation and purification of wax from wax containing mineral oils and tarry residues, the process which comprises mixing the said materials with a differential solvent mixture containing poor wax solvents and good wax solvents, chilling the mixture, separating the wax from the mixture separating the solvents from residual liquid and thereafter further purifying the separated wax by treatment with the said poor solvents.

3. In the separation and purification of wax from wax containing mineral oils and tarry residues, the process which comprises mixing the said materials with a differential solvent mixture containing poor wax solvents and good wax solvents, separating the wax from the residual solvent mixture, stripping the said residual solvent mixture to thereby separate and recover wax free residues, the poor wax solvents and the good wax solvents, suspending the separated wax in the recovered poor solvents and separating and recovering wax from the said suspension.

4. In the separation and purification of wax from wax containing mineral oils and tarry residues, the process which comprises mixing the said materials with a differential solvent mixture containing poor wax solvents and good wax solvents, chilling the mixture, separating the wax from the residual solvent mixture, stripping the said residual solvent mixture to thereby separate and recover wax free residues, the poor wax solvents and the good wax solvents, suspending the separated wax in the recovered poor solvents, chilling the suspension and separating and recovering wax from the said suspension.

5. In the separation and purification of wax from wax containing mineral oils and tarry residues, the process which comprises mixing the said materials with a differential solvent mixture containing poor wax solvents and good wax solvents, separating the wax from the residual solvent mixture, stripping the said residual solvent mixture to thereby separate and recover wax free residues, the poor wax solvents and the good wax solvents, suspending the separated wax in the recovered poor wax solvents, separating the wax from the said suspension, washing the separated wax with additional poor wax solvents and stripping the washed wax to purify the same and to recover poor wax solvents therefrom.

6. In the separation and purification of wax from wax containing mineral oils and tarry residues, the process which comprises mixing the said materials with a differential solvent mixture containing poor wax solvents and good wax solvents, chilling the mixture, separating the wax from the residual solvent mixture, stripping the said residual solvent mixture to thereby separate and recover wax free residues, the poor wax solvents and the good wax solvents, suspending the separated wax in the recovered poor wax solvents, chilling the suspension, separating the wax from the said suspension, washing the separated wax with additional poor wax solvents and stripping the washed wax to purify the same and to recover poor wax solvents therefrom.

7. In the separation and purification of wax from wax containing mineral oils and tarry residues, the process which comprises mixing the said materials with a differential solvent mixture containing poor wax solvents and good wax solvents, separating the wax from the residual solvent mixture, stripping the said residual solvent mixture to thereby separate and recover wax free residues, the poor wax solvents and the good wax solvents, suspending the separated wax in the recovered poor wax solvents, separating and recovering the suspended wax from the residual poor wax solvents, and returning the separated and recovered solvents to serve in a repetition of the process.

8. In the separation and purification of wax from wax containing mineral oils and tarry residues, the process which comprises mixing the said materials with a differential solvent mixture containing poor wax solvents and good wax solvents, chilling the mixture, separating the wax from the residual solvent mixture, stripping the said residual solvent mixture to thereby separate and recover wax free residues, the poor wax solvents and the good wax solvents, suspending the separated wax in the recovered poor wax solvents, chilling the suspension, separating and recovering the suspended wax from the residual poor wax solvents, and returning the separated and recovered solvents to serve in a repetition of the process.

9. In the separation and purification of wax from wax containing mineral oils and tarry residues, the process which comprises mixing the said materials with a differential solvent mixture containing poor wax solvents and good wax solvents, separating the wax from the residual solvent mixture, stripping the said residual solvent mixture to thereby separate and recover wax free residues, the poor wax solvents and the good wax solvents, suspending the separated wax in the recovered poor wax solvents, separating the suspended wax from the said suspension, stripping the poor wax solvents from the wax, recovering the so purified wax, uniting the poor wax solvents recovered in the wax separating and stripping operations with the recovered good wax solvents to reconstitute a differential solvent mixture, and returning the said mixture to the first step in the process.

10. In the separation and purification of wax from wax containing mineral oils and tarry residues, the process which comprises mixing the said materials with a differential solvent mixture containing poor wax solvents and good wax solvents, chilling the mixture, separating the wax from the residual mixture, stripping the said residual solvent mixture to thereby separate and recover wax free residues, the poor wax solvents and the good wax solvents, suspending the separated wax in the recovered poor wax solvents, chilling the suspension, separating the wax from the said suspension, stripping the poor wax solvents from the wax, recovering the so purified wax, uniting the poor wax solvents recovered in the wax, separating and stripping operations with the recovered good wax solvents to reconstitute a differential solvent mixture, and returning the said mixture to the first step in the process.

11. In the separation and purification of wax from wax containing mineral oils and tarry residues, the process which comprises mixing the said materials with a good wax solvent, gradually adding a poor wax solvent, separating and recovering the wax, stripping the residual solvent mixture to thereby separate and recover wax free residues, the poor wax solvents and the good wax solvents, and returning the separated and recovered solvents to serve in a repetition of the process.

12. In the separation and purification of wax from wax containing mineral oils and tarry residues, the process which comprises mixing the said materials with a good wax solvent, gradually adding a poor wax solvent, separating and recovering the wax; the mixture being chilled before separation of the said wax; stripping the residual solvent mixture to thereby separate and recover wax free residues, the poor wax solvents and the good wax solvents, and returning the recovered solvents to serve in a repetition of the process.

13. In the separation and purification of wax from wax containing mineral oils and tarry residues, the process which comprises mixing the said materials with a good wax solvent, gradually adding a poor wax solvent, separating and recovering the wax, stripping the residual solvent mixture to thereby separate and recover wax free residues, the poor wax solvents and the good wax solvents, suspending the separated wax in the recovered poor wax solvents, separating and recovering wax from the residual poor solvents, and returning the said residual poor wax solvents and the recovered good wax solvents to serve in a repetition of the process.

14. In the separation and purification of wax from wax containing mineral oils and tarry residues, the process which comprises mixing the said materials with a good wax solvent, gradually adding a poor wax solvent, separating and recovering the wax, stripping the residual solvent mixture to thereby separate and recover wax free residues, the poor wax solvents and the good wax solvents, suspending the separated wax in the recovered poor wax solvents, separating and recovering wax from the residual poor solvents, stripping the poor wax solvents from the separated wax, recovering the so purified wax, and returning the recovered poor wax solvents and good wax solvents to serve in a repetition of the process.

15. The process of claim 1 in which is employed a differential solvent mixture containing ethylene dichloride as a poor wax solvent and benzol as a good wax solvent.

16. The process of claim 2 in which is employed a differential solvent mixture containing ethylene dichloride as a poor wax solvent and benzol as a good wax solvent.

17. The process of claim 4 in which is employed a differential solvent mixture containing ethylene dichloride as a poor wax solvent and benzol as a good wax solvent.

18. The process of claim 6 in which is employed a differential solvent mixture containing ethylene dichloride as a poor wax solvent and benzol as a good wax solvent.

19. The process of claim 8 in which is employed a differential solvent mixture containing ethylene dichloride as a poor wax solvent and benzol as a good wax solvent.

20. The process of claim 10 in which is employed a differential solvent mixture containing ethylene dichloride as a poor wax solvent and benzol as a good wax solvent.

In testimony whereof, I have hereunto affixed my signature.

CLARENCE J. LIVINGSTONE.